United States Patent
McGilliard et al.

(10) Patent No.: US 9,343,054 B1
(45) Date of Patent: May 17, 2016

(54) TECHNIQUES FOR ORDERING DIGITAL MUSIC TRACKS IN A SEQUENCE

(71) Applicant: Amazon Technologies, Inc., Reno, NV (US)

(72) Inventors: Christopher Lon McGilliard, Seattle, WA (US); Toby Ray Latin-Stoermer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/313,183

(22) Filed: Jun. 24, 2014

(51) Int. Cl.
| | |
|---|---|
| *A63H 5/00* | (2006.01) |
| *G10H 7/00* | (2006.01) |
| *G04B 13/00* | (2006.01) |
| *G06F 17/30* | (2006.01) |
| *H04N 21/262* | (2011.01) |
| *H04N 21/81* | (2011.01) |

(52) U.S. Cl.
CPC .......... *G10H 7/002* (2013.01); *G06F 17/30743* (2013.01); *G06F 17/30772* (2013.01); *H04N 21/26258* (2013.01); *H04N 21/8113* (2013.01)

(58) Field of Classification Search
CPC .................... G06F 17/30772; G06F 17/30743; H04N 21/26258; H04N 21/8113
USPC ...................................................... 84/609, 615
See application file for complete search history.

(56) References Cited

U.S. PATENT DOCUMENTS

| | | | |
|---|---|---|---|
| 7,003,515 B1* | 2/2006 | Glaser et al. .................. 707/723 |
| 8,694,666 B2* | 4/2014 | Dixon .......................... 709/231 |
| 8,700,795 B2* | 4/2014 | Boulter et al. ................ 709/231 |
| 2006/0112810 A1* | 6/2006 | Eves et al. ...................... 84/609 |
| 2006/0206478 A1* | 9/2006 | Glaser et al. ..................... 707/5 |
| 2009/0055376 A1* | 2/2009 | Slaney et al. .................... 707/5 |
| 2009/0217804 A1* | 9/2009 | Lu et al. ......................... 84/602 |
| 2010/0162115 A1* | 6/2010 | Ringewald et al. ........... 715/716 |
| 2011/0196867 A1* | 8/2011 | Hyman ........................ 707/737 |
| 2012/0290621 A1* | 11/2012 | Heitz et al. .................... 707/780 |
| 2014/0018947 A1* | 1/2014 | Ales .............................. 700/94 |
| 2014/0074861 A1* | 3/2014 | Bieschke et al. ............. 707/748 |
| 2014/0229894 A1* | 8/2014 | Vinna et al. ................... 715/810 |
| 2014/0277638 A1* | 9/2014 | Smith ............................. 700/94 |

* cited by examiner

*Primary Examiner* — Jeffrey Donels
(74) *Attorney, Agent, or Firm* — Weaver Austin Villeneuve & Sampson LLP

(57) ABSTRACT

Techniques are described for automatically re-ordering digital music tracks in a sequence for playback on a digital device. The sequence of digital music tracks is algorithmically arranged to provide better transitions between the digital music tracks in the sequence.

20 Claims, 5 Drawing Sheets

Next Track 420

| | | Track A | Track B | Track C | Track D |
|---|---|---|---|---|---|
| | Track A | X | 1 | 7 | 3 |
| Track 410 | Track B | 1 | X | 1 | 1 |
| | Track C | 2 | 11 | X | 12 |
| | Track D | 1 | 1 | 1 | X |

|  | Next Track 420 | | | |
|---|---|---|---|---|
|  | Track A | Track B | Track C | Track D |
| Track A | X | 1 | 7 | 3 |
| Track B | 1 | X | 1 | 1 |
| Track C | 2 | 11 | X | 12 |
| Track D | 1 | 1 | 1 | X |

Track 410

*FIG. 4*

TECHNIQUES FOR ORDERING DIGITAL MUSIC TRACKS IN A SEQUENCE

BACKGROUND

Consumers have an ever-increasing array of options for listening to digital music, both in terms of the number of content providers, as well as the variety of channels and devices through which music may be accessed. Content providers are becoming increasingly sophisticated and effective at providing access to vast amounts of musical content on demand, as well as identifying specific musical content that might be of interest to individual users. Success in the marketplace will depend in part on the ability of content providers and providers of products that play digital music to continue to provide new and convenient mechanisms for consumers to consume musical content.

BRIEF DESCRIPTION OF THE DRAWINGS

FIG. 4 illustrates examples of track propensity scores.

DETAILED DESCRIPTION

This disclosure describes techniques for automatically ordering digital music tracks, in a sequence for playback in a way that provides a pleasurable listening experience for a user. The tracks might be, for example, provided by the user, a music discovery service, internet radio stations, or a combination (e.g., the user and a music discovery service). The sequence of the tracks is algorithmically determined based on a track propensity score of each track in relation to other tracks. The track propensity score represents the tendency for a particular track to be played after another specific track, and may be based on a variety of factors, such as musical characteristics of the digital music track (e.g., beats per minute, harmony, dissonance), track sequences provided by other users, track sequences provided by music providers (e.g., radio stations), and other factors.

Figure 1:
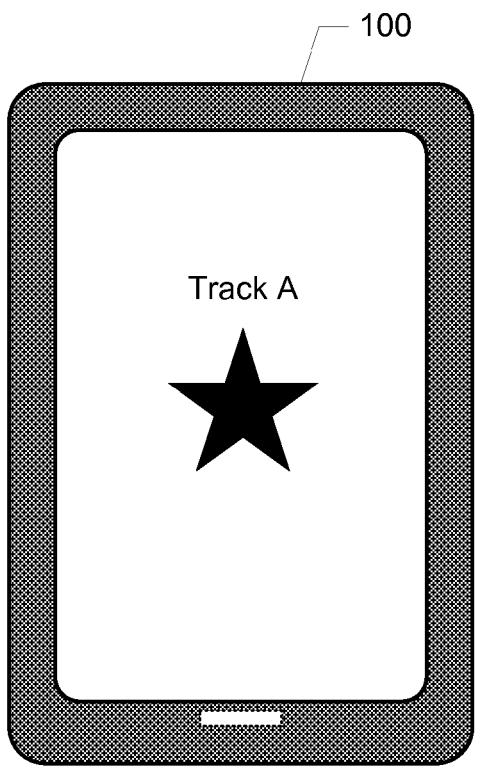
FIG. 1 shows examples illustrating operations of a process for ordering tracks in a sequence.

For example, as shown in FIG. 1, a user of digital device 100 might provide playlist 120a specifying four tracks for playback: Track A, Track B, Track C, and Track D. This results in playback of the four tracks for playback on digital device 100 in the sequence specified in playlist 120a. However, the tracks in the playlist might be re-ordered to provide a more pleasurable listening experience by changing the sequence in which the tracks are played. For example, playlist 120a might be re-ordered to provide the same four tracks for playback in a different sequence in playlist 120b: Track A, Track C, Track D, and Track B. Additional tracks might also be provided so that more than the four tracks provided by the user may be in the playlist. For example, playlist 120c includes three additional tracks not specified by the user of digital device 100: Track X, Track Y, and Track Z. In playlist 120c, the three additional tracks are also inserted into the sequence so that the playlist 120c provides a sequence of: Track A, Track X, Track Z, Track C, Track D, Track Y, and Track B.

Re-ordering tracks as described herein may provide a more pleasurable listening experience for the user because the sequence of the tracks can be selected to provide pleasing transitions from one track to the next. For example, transitioning from a track with an average of 150 beats-per-minute to another with an average of 100 beats-per-minute may be jarring to a user, and therefore, the transition may be avoided by transitioning instead to another track having an average of 145 beats-per-minute. Other characteristics of the music of the tracks (e.g., dissonance and harmony), track sequences provided by other users, track sequences provided by radio stations, and other factors may also be considered to provide pleasing transitions between tracks.

Figure 2:
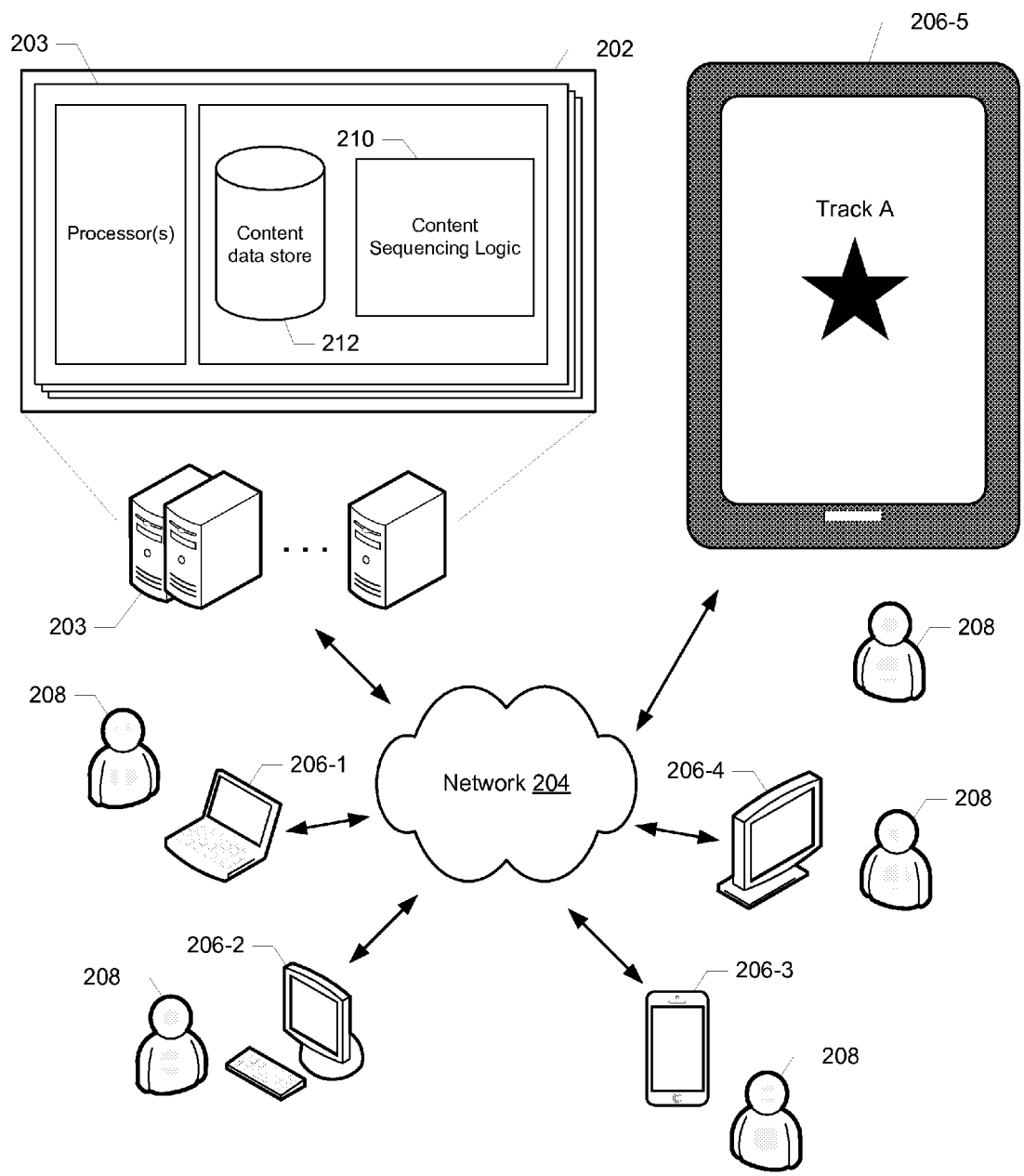
FIG. 2 illustrates an example of a computing environment in which tracks may be ordered in a sequence and delivered.

FIG. 2 illustrates an example of a computing environment in which musical experiences can be enriched by the re-ordering of tracks as described herein in conjunction with use of a sequencing service 202 (e.g., provided by a music service such an internet streaming music player, internet radio, music discovery service, etc.) via network 204 by a variety of client devices (206-1 through 206-5) associated with users 208. Sequencing service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extra-nets, etc. Client devices 206 may be any suitable device capable of connecting to network 204 and consuming services provided by sequencing service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc. In addition, at least some of the examples described herein contemplate various distributed computing implementations based on computing models that enable ubiquitous, convenient, on-demand network access to a shared pool of computing resources (e.g., networks, servers, storage, applications, and services).

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular protocols herein are merely by way of example. Suitable alternatives known to those of skill in the art may be employed.

Sequencing service 202 may be integrated with, for example, a musical content service with which users may discover tracks, be provided with a sequence of tracks, and consume musical content including the tracks. As with conventional services, this enhanced service may include various types of logic and provide interfaces with which users may search for and download or connect with musical content (not shown for clarity). In addition, sequencing service 202 includes content sequencing logic 210 configured to select tracks from musical content (represented in content data store 212) for playback in a sequence in response to a selection of music as described herein. It should be noted that, while content sequencing logic 210 and content data store 212 are contemplated as part of a musical content service, implementations are contemplated in which either or both operate remotely from musical content service, and/or either or both are under the control of an independent entity. Implementations are also contemplated in which some or all of the functionality of content sequencing logic 210 and/or at least some of the musical content is implemented and/or stored on client device (e.g., device 206-5).

Figure 3:
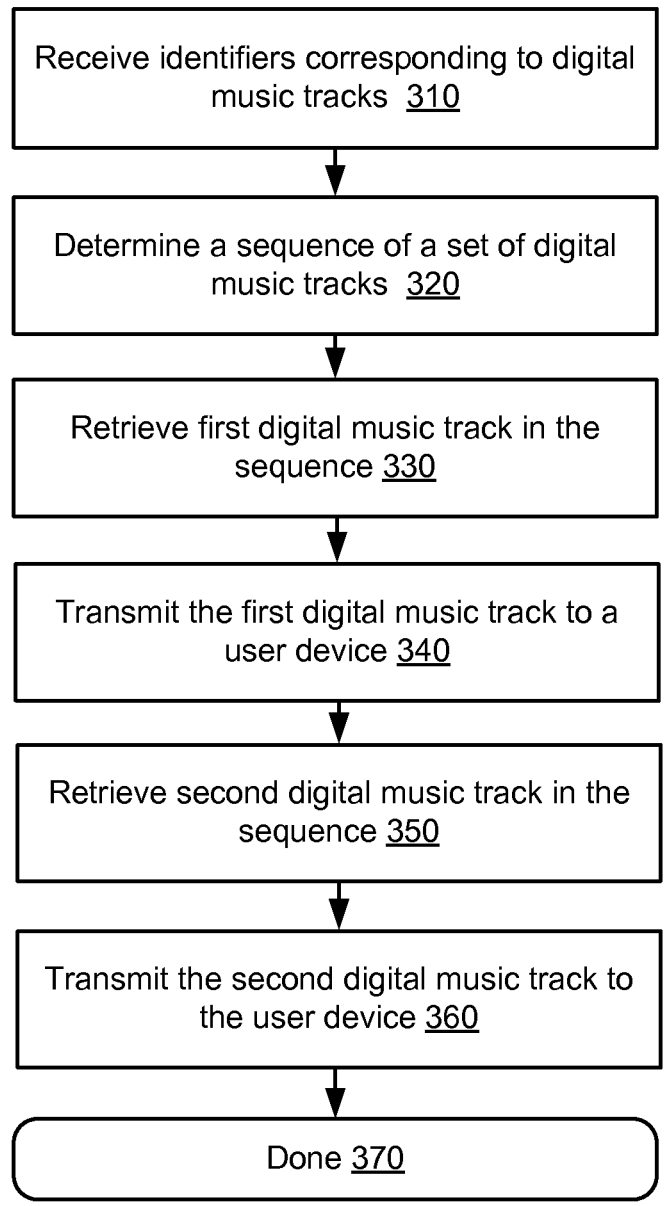
FIG. 3 is a flowchart illustrating operation of a particular implementation.

A specific implementation will now be described with reference to the computing environment of FIG. 2 and the flow diagram of FIG. 3. In the depicted implementation, a user initiates playback of seed music by selecting the seed music using an interface of a music player such as, for example, the Amazon Cloud Player. The seed music may be, for example, a track, an album, or a playlist indicating tracks. The track(s) of the seed music may be stored on the user's device or a storage device under control of the user, or may be stored on a remote server, e.g., as part of a hosted music service (e.g., in content data store 212). The rights to the selected seed music may or may not be entirely owned by the user. Suitable variations and combinations of these variants will be apparent to those of skill in the art.

Sequencing service 202 can add tracks beyond the seed music for playback. The additional tracks may be, for example, provided by a music discovery service provided by sequencing service 202. A music discovery service identifies additional tracks to play based on the provided seed tracks. The discovery of additional tracks may be based on activities of other users (e.g., what other users are listening to), characteristics of the music (e.g., theme, category, etc.), types of artists, or other types of data. U.S. patent application Ser. No. 14/103,444, titled TECHNIQUES FOR SELECTING MUSICAL CONTENT FOR PLAYBACK, by Durham et al., filed on Dec. 11, 2013, discloses automatic selection and playback of music consistent with the seed music, and is hereby incorporated by reference in its entirety and for all purposes.

In any case, identifiers corresponding to tracks are received by sequencing service 202 (310). Next, sequencing service 202 analyzes the tracks corresponding to the identifiers to determine a sequence for playback for a client device (320).

The sequence of tracks for playback is based on a track propensity score generated for track-to-track pairs in content data store 212 of sequencing service 202. The track propensity score indicates a likelihood or tendency for one track to be played following a prior track. The track propensity score might be derived, for example, from musical characteristics of the tracks (e.g., beats-per-minute), selections of sequences of tracks from other users, and selections of sequences of tracks from professionals such as disc jockeys (DJs).

FIG. 4 illustrates an example of a set of track propensity scores. Each of the depicted track propensity scores in the table represents the likelihood or tendency for a specific track to follow another in a group of tracks including Track A, Track B, Track C and Track D. The rows of the table (Track 410) represent reference tracks, and the columns (Next Track 420) represent follower tracks to be played in a sequence following (e.g., immediately afterwards) the reference tracks 410. The values in the table for each transition from a reference track 410 to a next track 420 are the track propensity scores for the track-to-track pairs.

For example, for Track A, a transition from Track A to Track B has a track propensity score of 1. A transition from playing Track A to Track C has a track propensity score of 7. A transition from playing Track A to Track D has a track propensity score of 3. Since the transition from Track A to Track C has the highest score, sequencing service 202 selects Track C to follow Track A.

To determine the track transition following Track C, the track propensity scores for transitions between Track C and the remaining tracks (i.e., the tracks not currently in the sequence) are determined and used. In FIG. 4, a transition from Track C to Track B has a track propensity score of 11. A transition from Track C to Track D has a track propensity score of 12. Since the transition from Track C to Track D has the highest, sequencing service 202 selects Track D to follow Track C.

Since Track B is the last remaining track not in the sequence, sequencing service 202 selects Track B to be played back following Track D. Accordingly, the sequence provides a playback of the four tracks in the following sequential order: Track A, Track C, Track D, and Track B.

In the example of FIG. 4, a track transition from a track to itself is excluded. However, in another implementation, a track propensity score for a transition from the track to itself can exist so that a track could repeat. For example, a transition from Track A to Track A again can have a track propensity score of 0.5.

Moreover, in the above simplified example, tracks that have been included in the sequence once are excluded from repeating in the sequence. However, in other implementations, tracks that have been previously selected to be in the sequence can be re-selected to appear again later in the sequence.

In some implementations, the first track in the sequence can be selected based on the track propensity scores. For example, the first track in the sequence can be selected based on the transition between two tracks with the highest track propensity score such that the two tracks will be the first two tracks in the sequence (e.g., the track in track 410 would be the first track and the track in next track 420 would be the second track). In another example, the first track can be the track in next track 420 that corresponds to the lowest track propensity score so that the most difficult-to-place track may be played first. In another example, the first track can be based on summing the track propensity scores for each transition in every possible sequence and determining the average track propensity score for each of the possible sequences. The possible sequence with the highest average track propensity score can be selected as the sequence and/or the first track in the sequence with the highest average track propensity score can be selected as the first track.

According to some implementations, a threshold track propensity score range can be used to maintain tracks in a sequence. As an example, a sequence of tracks may be provided to sequencing service 202. The provided sequence may already indicate a potential sequence of tracks for playback: Track A, Track B, Track C, and Track D.

Since Track B follows Track A in the provided sequence, the track propensity score for the transition from Track A to Track B can be checked, and if the track propensity score is below a threshold track propensity score range, the provided sequence can be modified to create a new sequence.

For example, the threshold track propensity score range may be 5 or higher (in other examples, the threshold track propensity score range may be 5 or lower, 3-7 out of a scale of 1-10, or any other indication of a range of values). When a transition from a first track to a second track is outside the threshold track propensity score range, the second track is removed from the sequence, and therefore, not provided for playback. In FIG. 4, since the transition from Track A to Track B has a track propensity score of 1 (i.e., outside the threshold track propensity score range of 5 or higher), Track B is removed from the sequence. The sequence may now provide a playback sequence of: Track A, Track C, and Track D.

Next, the transition from Track A to Track C is checked to see if the corresponding track propensity score is at or above the threshold track propensity score range. In FIG. 4, the transition from Track A to Track C has a track propensity score of 7. Since the track propensity score of 7 is above 5, Track C is maintained in the sequence.

Next, the transition from Track C to Track D is checked. Since the track propensity score for the transition from Track C to Track D is 12, Track D is also maintained in the sequence. The sequence of tracks for playback may now be: Track A, Track C, and Track D.

According to another implementation, Track B may not be removed from the sequence, but positioned at the end of the sequence. Accordingly, the tracks that would result in a bad transition may be provided at the very end of the sequence of tracks.

Additionally, a sequence of tracks can be selected based on an average of track propensity scores of a set of transitions. For example, an average track propensity score for every possible sequence of the tracks can be calculated. The sequence with the highest average track propensity score can be provided as the sequence for playback.

The provided sequence may also be analyzed by sequencing service 202 and the number of transitions among the tracks that meet or exceed the threshold track propensity score can be counted and/or the number of transitions among the digital tracks that fail to meet the threshold track propensity score can be counted. If the number of transitions exceeds a particular threshold number of good transitions, then the provided sequence may be determined to be acceptable. Alternatively, if the number of transitions is below the threshold number of good transitions, sequencing service 202 may then perform any of the operations disclosed herein to provide a better sequence of tracks for playback. Additionally, the number of bad transitions can be counted and if above a threshold number of bad transitions then sequencing service 202 may perform any of the operations disclosed herein.

After the sequence of tracks is determined, the tracks are provided to the user device for playback. For example, the first track in the sequence can be retrieved from content data store 212 (330). The first track may then be provided to the user device (340).

After the first track is provided to the user device, the second track in the sequence can be retrieved from the content data store 212 (350). The second track may then be provided to the user device, for example, after the first track finishes playing (360).

In the above example, the tracks are provided to the user device one-at-a-time. However, in other implementations, all or a subset of the tracks in the sequence can be provided to the user device at the same time. In some implementations, some tracks can already be on the user device and other tracks in the sequence are provided to the user device. In that implementation, the sequence can be provided to the user device along with the tracks that are not already on the user device.

Figure 5:
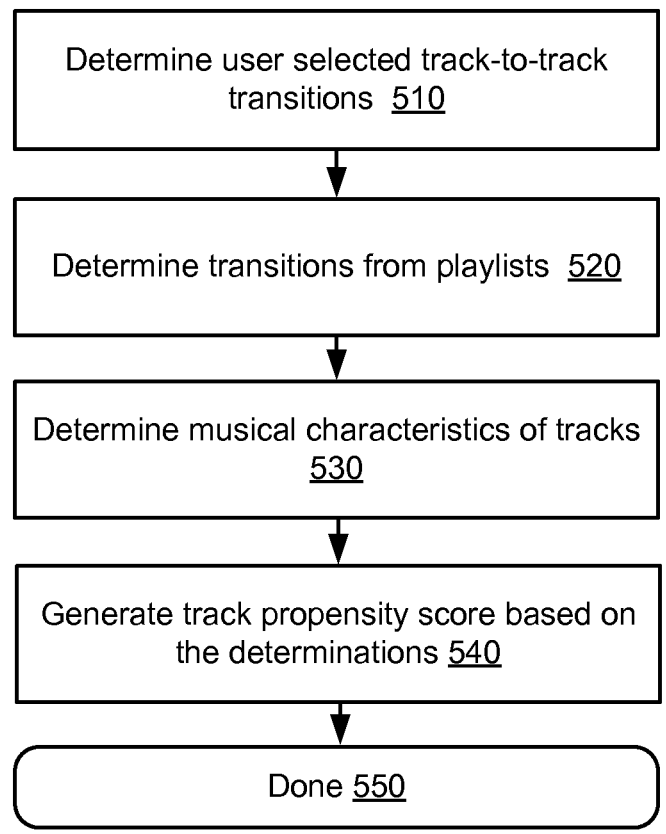
FIG. 5 is a flowchart illustrating determining track propensity scores of a particular implementation.

The track propensity scores for the track-to-track transitions in FIG. 4 may be based on a variety of sources of data. For example, the track propensity scores can be based on musical characteristics associated with the tracks or how others arrange tracks in sequences. FIG. 5 is a flowchart illustrating determining track propensity scores of a particular implementation.

How others play tracks can provide insight relating to desirable track transitions (510). For example, a user of a service may select one track for playback. The track may be selected by the user among a large catalog of tracks including hundreds of thousands or millions of tracks. After the user listens to the track, the user may then select a second track for playback in the catalog of millions of tracks. The second track may be from a different artist, in a different genre, in a different language, and so forth. However, the user purposefully selecting the second track after the first track may indicate that a transition between the first track to the second track may be desirable. Therefore, the track propensity score for the transition may be increased due to the manual selection of the tracks by the user. Additionally, any user-provided playlists of sequences of tracks may also be used to determine track propensity scores.

For example, if Track X is played followed by Track Y, but Track Z is never played following Track X, then the track propensity score (or the contribution to the track propensity score based on user selections if multiple factors are considered in determining the track propensity score) of the transition from Track X to Track Y may be higher than the track propensity score for the transition from Track X to Track Z.

However, not all playback data may be beneficial in determining a track propensity score. For example, if a user shuffles a library of tracks (i.e., the tracks are played at random), then the transitions between tracks may be ignored. Additionally, a user merely selecting a full album for play, playlists only containing a single artist, or other selections that are not associated with a purposeful selection of another track following another track may also be ignored. Moreover, any selections or playlists following an ordering that is clearly unrelated to aesthetically pleasing transitions (e.g., alphabetical or chronological sequences) may also be ignored.

Additionally, playlists provided by users of the service may also be "mined" to determine good transitions between tracks and used, in part, to determine the track propensity score (520). In effect, any type of user specification of playing tracks in a sequence can be used to determine track propensity scores.

Expert-generated playlists can also be "mined" to determine good transitions between tracks. For example, radio stations (e.g., FM radio stations, internet radio, satellite radio, etc.) have disc jockeys (DJs) curating music for broadcast on their radio stations. The music may be selected by the DJs in a particular sequence that may be done on purpose, for example, for maintaining a large audience based on the best perceived sequence for the music. Accordingly, the track propensity scores for the tracks corresponding to the DJ's selections may also based, at least in part, on the expert-generated (i.e., DJs) playlists. Data regarding the selections of DJs may be sourced from services aggregating radio station play data.

Additionally, musical characteristics of the tracks may also be used to determine the track propensity scores (530). The musical characteristics can include beats-per-minute (e.g., the pace of the track), dissonance (e.g., an unstable quality of sound), harmony (e.g., simultaneous use of harmonically related pitches or chords), gender of singers, types of instrumentation, beat styles, meter, etc.

For example, transitioning from a track with an average of 150 beats-per-minute (bpm) to another track with an average of 100 bpm may be more jarring to a user than transitioning from the digital music track with the average of 150 bpm to a track with an average of 145 bpm. The track propensity score for the transition from the 150 bpm track to the 145 bpm track may have a higher value than the transition from the 150 bpm track to the 100 bpm track. As another example, the track propensity score for a transition from a track ending with 150 bpm to another track beginning with 145 bpm may have a higher value than a transition from the track ending with 150 bpm to another track beginning with 100 bpm to reduce jarring transitions.

The track propensity scores for transitions between tracks may be based on any combination or order of the aforementioned sources of data (540). For example, track propensity scores may be based on musical characteristics and user selections of music, but not playlists. Additionally, the different sources of data may be weighted differently to provide different contributions to the track propensity scores. For example, user selections of tracks may provide more towards the track propensity scores than expert-generated playlists. Alternatively, the expert-generated playlists may provide more towards the track propensity scores than the user selections.

Additionally, track propensity scores may be one factor to consider when generating a sequence of tracks for playback. According to some implementations, ordering a sequence of tracks for playback may consider track propensity scores as well as other sources of data, such as customer personalization data (e.g., data indicating a customer's preference for genres of music, age of music, language, etc.) and ratings (e.g., users may vote a score for a track, indicate that they "like" the track, or other indications of a score or recommendation). Moreover, randomization may also be provided so that the sequence may not be the same all the time.

In other implementations, the sequencing may involve media files other than music tracks. For example, video files (e.g., television shows, movies, video clips, movie trailers, commercials or advertisements, etc.) can be sequenced for playback. Images (e.g., JPEG or GIF files, including animated and non-animated images) can also be sequenced for playback in a slideshow. A mix of video files and images (i.e., different types of media files) can also be provided in a sequence. How other users and/or experts selected video files or images for playback can be used to determine the sequence, similar to how music tracks may be sequenced as disclosed herein.

In some implementations, advertisements may be selected to be played following a track if all of the available tracks to follow the track correspond to a track propensity score outside of a threshold track propensity score range. Such an implementation may be useful to "disrupt" a sequence of tracks and re-start with a new sequence of tracks. Additionally, a transition from tracks to advertisements may also include track-to-advertisement propensity scores similar to FIG. 4 as described herein. The advertisement to play to disrupt the sequence of tracks can be selected based on the track-to-advertisement propensity scores. The track-to-advertisement propensity scores can be based on the type of product in the advertisement (e.g., a track including lyrics on the product or type of product (e.g., soft drinks) can have a higher score than a product not included in the lyrics or is a different type of product), customer purchasing habits (e.g., customers who listen to a track tend to purchase a particular product), etc.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method, comprising:
   receiving, by one or more computing devices, a request from a client device for playback of musical content by a music delivery service;
   receiving, by the one or more computing devices, a plurality of identifiers, each of the identifiers corresponding to one of a plurality of music tracks selected for playback on the client device;
   determining, by the one or more computing devices, a sequence of the music tracks with reference to a plurality of track propensity scores, each track propensity score representing a tendency for a particular one of the music tracks to immediately follow another one of the music tracks during playback; and
   transmitting, by the one or more computing devices, the music tracks to the client device for playback in the sequence.

2. The method of claim 1, wherein the track propensity scores are based on musical characteristics of the music tracks, the musical characteristics including beats per minute, harmony, or dissonance.

3. The method of claim 1, wherein the track propensity scores are based on sequences of the music tracks selected by a population of users of the music delivery service providing musical content.

4. The method of claim 1, wherein the track propensity scores are further based sequences of the music tracks selected by a population of music providers providing musical content.

5. A computing device, comprising:
   one or more processors and memory configured to:
   select a plurality of media files for playback;
   determine a sequence of the media files with reference to a plurality of propensity scores, each propensity score representing a tendency for a particular one of the media files to follow another one of the files during playback; and
   provide the media files for playback in the sequence.

6. The computing device of claim 5, wherein the media files correspond to music tracks and the propensity scores are based on musical characteristics of the music tracks.

7. The computing device of claim 6, wherein the musical characteristics include one or more of beats per minute, harmony, or dissonance.

8. The computing device of claim 5, wherein the media files correspond to music tracks and the propensity scores are based on sequences of the music tracks selected by a population of users of a music delivery service.

9. The computing device of claim 8, wherein the propensity scores are further based on sequences of the musical tracks selected by a population of music providers.

10. The computing device of claim 5, wherein the sequence is determined, at least in part, by comparing the propensity scores to a threshold propensity score range.

11. The computing device of claim 10, wherein transitions between media files corresponding to propensity scores within the threshold propensity score range are included in the sequence, and transitions media files corresponding to propensity scores outside the threshold propensity score range are excluded from the sequence.

12. The computing device of claim 10, wherein the sequence includes a first portion and a second portion, the first portion occurring in the sequence before the second portion, the first portion including transitions between media files corresponding to propensity scores within the threshold propensity score range, the second portion including transitions between media files corresponding to propensity scores outside the threshold propensity score range.

13. A computer program product, comprising one or more non-transitory computer-readable media having computer program instructions stored therein, the computer program instructions being configured such that, when executed by one or more computing devices, the computer program instructions cause the one or more computing devices to:
   select a plurality of media files for playback;
   determine a sequence of the media files with reference to a plurality of propensity scores, each propensity score representing a tendency for a particular one of the media files to follow another one of the files during playback; and
   provide the media files for playback in the sequence.

14. The computer program product of claim 13, wherein the media files correspond to music tracks and the propensity scores are based on musical characteristics of the music tracks.

15. The computer program product of claim 14, wherein the musical characteristics include one or more of beats per minute, harmony, or dissonance.

16. The computer program product of claim 13, wherein the media files correspond to music tracks and the propensity scores are based on sequences of the music tracks selected by a population of users of a music delivery service.

17. The computer program product of claim 16, wherein the propensity scores are further based on sequences of the musical tracks selected by a population of music providers.

18. The computer program product of claim 13, wherein the sequence is determined, at least in part, by comparing the propensity scores to a threshold propensity score range.

19. The computer program product of claim 18, wherein transitions between media files corresponding to propensity scores within the threshold propensity score range are included in the sequence, and transitions of media files corresponding to propensity scores outside the threshold propensity score range are excluded from the sequence.

20. The computer program product of claim 18, wherein the sequence includes a first portion and a second portion, the first portion occurring in the sequence before the second portion, the first portion including transitions between media files corresponding to propensity scores within the threshold propensity score range, the second portion including transitions between media files corresponding to propensity scores outside the threshold propensity score range.

* * * * *